(12) United States Patent
Yoon

(10) Patent No.: US 9,884,589 B2
(45) Date of Patent: Feb. 6, 2018

(54) SYSTEM AND METHOD FOR ASSISTING VEHICLE DRIVING FOR USING SMART PHONE

(71) Applicant: Hyundai Motor Company, Seoul (KR)

(72) Inventor: Ji Hyun Yoon, Seoul (KR)

(73) Assignee: Hyundai Motor Company, Seoul (KR)

( * ) Notice: Subject to any disclaimer, the term of this patent is extended or adjusted under 35 U.S.C. 154(b) by 305 days.

(21) Appl. No.: 14/570,868

(22) Filed: Dec. 15, 2014

(65) Prior Publication Data

US 2016/0101733 A1 Apr. 14, 2016

(30) Foreign Application Priority Data

Oct. 8, 2014 (KR) .......................... 10-2014-0136040

(51) Int. Cl.
*B60R 1/00* (2006.01)
*H04N 7/18* (2006.01)
*B60W 40/00* (2006.01)

(52) U.S. Cl.
CPC ............... *B60R 1/00* (2013.01); *B60W 40/00* (2013.01); *B60R 2300/20* (2013.01); *H04N 7/18* (2013.01)

(58) Field of Classification Search
None
See application file for complete search history.

(56) References Cited

U.S. PATENT DOCUMENTS

| | | | |
|---|---|---|---|
| 2007/0203646 A1* | 8/2007 | Diaz | G01C 21/3688 701/469 |
| 2011/0087431 A1* | 4/2011 | Gupta | G01S 5/02 701/408 |
| 2011/0164105 A1* | 7/2011 | Lee | H04N 7/142 348/14.02 |
| 2011/0304444 A1* | 12/2011 | Zhang | B60K 35/00 340/425.5 |
| 2014/0354881 A1* | 12/2014 | Liao | G06F 3/0412 348/376 |
| 2014/0375075 A1* | 12/2014 | Liao | B60R 1/12 296/84.1 |
| 2014/0375760 A1* | 12/2014 | Lee | H04N 5/23238 348/36 |
| 2015/0116493 A1* | 4/2015 | Bala | G06K 9/00845 348/148 |

(Continued)

FOREIGN PATENT DOCUMENTS

| | | |
|---|---|---|
| JP | 2012-165336 A | 8/2012 |
| JP | 2013-124957 A | 6/2013 |

(Continued)

*Primary Examiner* — Mohammad J Rahman
(74) *Attorney, Agent, or Firm* — Mintz Levin Cohn Ferris Glovsky and Popeo, P.C.; Peter F. Corless

(57) ABSTRACT

A system and a method for assisting vehicle driving are provided. The system may select and use an imaging device among a plurality of imaging devices within a smart phone possessed by a driver or a passenger in a vehicle and assist in driving. A system includes a smart phone configured to capture an image in front of a vehicle and an inner image of the vehicle using the plurality of imaging devices within the smart phone and select one of the plurality of imaging devices. The system also includes a controller configured to analyze image information provided from the plurality of imaging devices to operate the smart phone or control the vehicle.

12 Claims, 2 Drawing Sheets

(56) References Cited

U.S. PATENT DOCUMENTS

| | | | | |
|---|---|---|---|---|
| 2015/0120151 A1* | 4/2015 | Akay | ............... | B60R 25/24 |
| | | | | 701/49 |
| 2015/0201113 A1* | 7/2015 | Wood | ............... | G03B 17/561 |
| | | | | 348/376 |
| 2015/0223032 A1* | 8/2015 | Nespolo | ............... | H04W 4/12 |
| | | | | 701/2 |
| 2015/0262343 A1* | 9/2015 | Lee | ............... | G06T 5/006 |
| | | | | 348/148 |

FOREIGN PATENT DOCUMENTS

| | | |
|---|---|---|
| KR | 2005-0015903 A | 2/2005 |
| KR | 2006-0076565 A | 7/2006 |
| KR | 2008-0107652 A | 12/2008 |
| KR | 2012-0117442 A | 10/2012 |
| KR | 2013-0131580 A | 12/2013 |
| KR | 10-2014-0041005 A | 4/2014 |

\* cited by examiner

SYSTEM AND METHOD FOR ASSISTING VEHICLE DRIVING FOR USING SMART PHONE

CROSS-REFERENCE TO RELATED APPLICATION

Pursuant to 35 U.S.C. §119(a), this application claims the benefit of priority to Korean Patent Application No. 10-2014-0136040, filed on Oct. 8, 2014, the disclosure of which is incorporated herein in its entirety by reference.

TECHNICAL FIELD

The present disclosure relates to a system and a method for assisting vehicle driving using a smart phone, and more particularly, to a technology of automatically selecting one of a plurality of imaging devices in a smart phone used in the system for assisting vehicle driving.

BACKGROUND

Recently developed intelligent vehicles having increased convenience, safety, and the like tend to be luxurious and expensive. An intelligent vehicle is generally equipped with various driver assistance systems which enhance driver convenience. One such advanced driver assistance system (ADAS) includes an imaging device sensor. The imaging device sensor is configured to sense front, back, left, and right spaces including a dead zone (e.g., a blind spot or spots) which may not be seen by a driver, to provide a safer driving environment.

The imaging device sensor may be classified into one of three types based on the zone the imaging device sensor is configured to surveil. First, a system equipped to receive a front image of a vehicle for front surveillance senses a front lane or a front vehicle while a vehicle is driven to maintain a driving lane, prevent a front collision, and the like. Second, a system configured to sense an image of the dead zone, including the left and right of the vehicle, for rear surveillance is to prevent a collision, surveil the dead zone, and the like, at the time of a lane change. Third, a system configured to receive a rear image of a vehicle for rear surveillance is for the rear sensing, and the like, (e.g., while driving backward or parking). As a result, the current imaging device sensor senses the front, rear, left, and right spaces of the vehicle to enhance safety in the driving environment. However, current systems come at high costs associated with mounting the imaging device sensors for improving driver convenience.

SUMMARY

The present disclosure provides a system and a method for assisting vehicle driving capable of automatically selecting and using an effective imaging device (coinciding with a driving direction of a vehicle) among a plurality of imaging devices (e.g., cameras, video cameras and the like) within a smart phone by building a system for assisting a vehicle interacting with smart phones or smart devices which are possessed by a driver or passengers within a vehicle. Other objects and advantages of the present disclosure may be appreciated by the following description and will be clearly described by the exemplary embodiments of the present disclosure. Also, it may be easily understood that the objects and advantages of the present disclosure may be realized by the units and combinations thereof recited in the claims.

According to an exemplary embodiment of the present disclosure, a system for assisting vehicle driving using a smart phone including a plurality of imaging devices, may include: a smart phone configured to capture an image in front of a vehicle and an inner image of the vehicle using the plurality of imaging devices and automatically select one of the plurality of imaging devices; and a controller configured to analyze image information provided from the plurality of imaging devices to operate the smart phone or the vehicle. The smart phone may include an imaging device sensor, a gyroscope sensor, an accelerator sensor, a magnetic field sensor, an illumination sensor, a proximity sensor, and a gravity sensor. In addition, system for assisting vehicle driving may include: an alarm configured to output an alarm message to the driver when image capture direction of the imaging device is not an image capture direction of the imaging device designated by a driver. The system for assisting vehicle driving may further include: a sensor configured to detect vehicle information including a driving speed of the vehicle, a longitudinal acceleration, a transversal acceleration, and an angle and an angular velocity of a wheel.

According to another exemplary embodiment of the present disclosure, a method for assisting vehicle driving using a smart phone including a plurality of imaging devices, may include: automatically performing image capturing, by a front imaging device and a rear imaging device within the smart phone, before a vehicle is driven; automatically selecting one of the front and rear imaging devices by comparing the captured images; automatically operating one of the front and rear imaging devices using a sensor provided by the smart phone when the vehicle is continuously driven; and operating the smart phone or the vehicle by analyzing image information provided from the plurality of imaging devices. In the automatic operation of one of the front and rear imaging devices using a sensor provided by the smart phone, the front and rear imaging devices may be configured to operate using signal output information of sensors in the smart phone. The sensor may include an imaging device sensor, a gyroscope sensor, an accelerator sensor, a magnetic field sensor, an illumination sensor, a proximity sensor, and a gravity sensor.

The accelerator sensor may be used simultaneously while driving the vehicle and when an accelerator sensor value of a −z axis in the smart phone is positive (+) or an accelerator sensor value is a −z value, the progress direction of the vehicle may be a −z axis direction, the rear imaging device may be selected and when the accelerator sensor value of a +z axis is positive (+) or the accelerator sensor value is a +z value, the progress direction of the vehicle may be a +z axis direction, the front imaging device may be automatically selected. The method for assisting vehicle driving may further include: outputting an alarm message to the driver when an image capture direction of the imaging device is not an image capture direction of the imaging device designated by a driver.

BRIEF DESCRIPTION OF THE DRAWINGS

The drawings are provided for reference in describing exemplary embodiments of the present invention, and the spirit of the present invention should not be construed only by the accompanying drawings. The above and other objects, features and other advantages of the present invention will be more clearly understood from the following detailed description when taken in conjunction with the accompanying drawings, in which.

DETAILED DESCRIPTION

Figure 1:
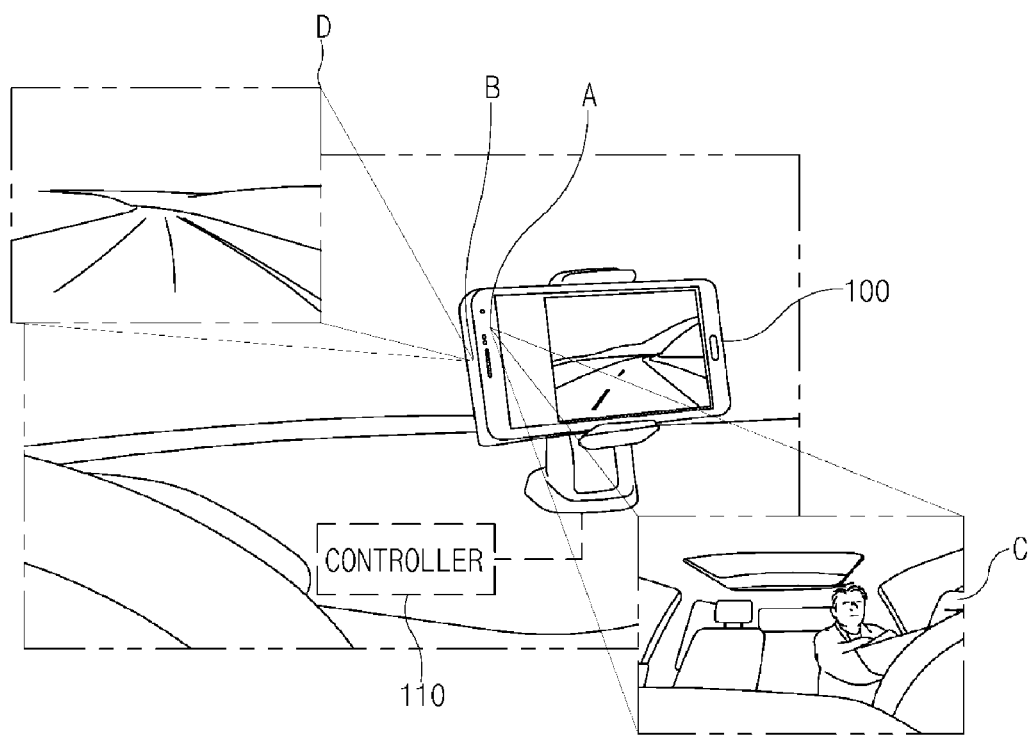
FIG. 1 is an exemplary diagram describing a system for assisting vehicle driving using a smart phone according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The foregoing objects, features and advantages will become more apparent from the following detailed description of exemplary embodiments of the present disclosure with reference to accompanying drawings, which are set forth hereinafter. Accordingly, those having ordinary knowledge in the related art to which the present disclosure pertains will easily embody technical ideas or spirit of the present disclosure. Further, when the detailed description of technologies known in the related art are considered to make the gist of the present disclosure obscure in the present disclosure, the detailed description thereof will be omitted. Hereinafter, exemplary embodiments of the present disclosure will be described in detail with reference to the accompanying drawings.

FIG. 1 is an exemplary diagram describing a system for assisting vehicle driving using a smart phone according to an exemplary embodiment of the present disclosure. Referring to FIG. 1, a system for assisting vehicle driving using a smart phone may include a smart phone 100 and a controller 110. The smart phone 100 may be configured to automatically select one of a plurality of imaging devices (e.g., a camera, a video camera, or the like) to capture an image in front of a vehicle and an inner image of the vehicle and the controller 110 may be configured to analyze image information provided from the plurality of imaging devices of the smart phone 100 to operate the smart phone 100 or operate the vehicle. The smart phone 100 may include the plurality of imaging devices and may include a front imaging device A which may be disposed at an upper end of a screen monitor and a rear imaging device B which may be disposed at an upper end of a rear surface of the screen monitor. In addition to the front and rear imaging devices, the plurality of imaging devices may also be disposed at a side or a lower end of the smart phone 100.

When the front imaging device A of the smart phone 100 is directed toward an inner direction of the vehicle, the front imaging device A may be configured to capture an inner image C of the vehicle and the rear imaging device B of the smart phone 100 may be configured to capture an image D including a mad, a lane, objects, and the like in front of a vehicle. However, when the front imaging device A of the smart phone 100 is directed toward a front direction of the vehicle, the front imaging device A may be configured to capture an image including a load, a lane, and objects, and the like in front of the vehicle and the rear imaging device B may capture the inner image of the vehicle. When a driver places the smart phone 100 on a supporter before or after a vehicle starts to drive, the plurality of imaging devices may be configured to automatically start to capture images and the controller 110 within the system for assisting vehicle driving may be configured to compare and analyze the captured images to select and operate an imaging device to be operated. The imaging device to be operated may be an imaging device disposed toward the front of the vehicle.

The controller 110 may be configured to select and operate the imaging device disposed toward the front of the vehicle and may be configured to determine whether quality and resolution of an image of the selected imaging device are appropriate (e.g. appropriateness may be determined by blurriness, edge detection, color contrast or other features of the captured images as appropriate). Further, the controller 110 may be configured to output an alarm message to a driver or sound an alarm for a driver while a vehicle is driven when an image capture direction of the imaging device is not an image capture direction of the imaging device designated by the driver. Further, the driver (or a passenger) may also directly set an aiming direction of an imaging device using the controller 110.

One of the plurality of imaging devices in the smart phone 100 may be automatically selected (e.g. by the controller, by the driver or by a passenger) while the vehicle is driven. When the vehicle is being driven, an imaging device to perform photographing may be automatically selected using an imaging device sensor, a gyroscope sensor, an accelerator sensor, a magnetic field sensor, an illumination sensor, a proximity sensor, a gravity sensor, and the like which are included in the smart phone 100. The imaging device sensor may be configured to compare the images of the imaging device to select the imaging device, the gyroscope sensor may be configured to use a rotation direction of the sensor to select the imaging device, the accelerator sensor and the magnetic field sensor may be configured to use a progress direction of the sensor to select the camera, the illumination sensor may be configured to use the progress direction of the sensor or a position of light to select the imaging device, and the proximity sensor be configured to use a contact or non-contact of an object to select the camera. In addition, the vehicle may further include a sensing device which configured to detect vehicle information which may include a driving vehicle speed, a longitudinal acceleration, a transversal acceleration, and an angle and an angular velocity of a wheel. The sensing device may include various types of devices which include the imaging device.

A method for assisting vehicle driving using a smart phone according to an exemplary embodiment of the present disclosure will be described in detail. First, a smart phone of a driver or passengers within a vehicle may be placed on a supporter. The monitor screen of the smart phone may be directed toward an inner direction of the vehicle and may also be supported and directed at a front direction of the vehicle. The plurality of imaging devices of the supported smart phone may be operated to automatically capture images in front of the vehicle and the inner image of the vehicle. Additionally, one of the front and rear imaging devices may be operated by comparing the captured image in front of the vehicle with the inner image of the vehicle. When the vehicle is continuously driven, one of the front and rear imaging devices may be operated using the sensors included in the smart phone. The sensor may include the imaging device sensor, the gyroscope sensor, the accelerator sensor, the magnetic field sensor, the illumination sensor, the proximity sensor, and the gravity sensor. One of the front and rear imaging devices may be operated using signal output information of the sensors included in the smart phone.

The smart phone of the vehicle, other smart devices, or the vehicle may be operated by analyzing the image information or the sensor information provided from the smart phone. In other words, when the vehicle starts to drive, the operation of the front or rear imaging devices may be selected by comparing and determining the images captured by the plurality of imaging devices and after the vehicle starts to drive, the driving direction or the acceleration direction may be recognized using the sensors included in the smart phone to select the operation of the front or rear imaging device. Further, the system for assisting vehicle driving be configured to compare and determine the images captured by the plurality of imaging devices from the time the vehicle begins to drive until the driving of the vehicle is completed to select the front or rear imaging device to operate one of the front and rear imaging devices or use the sensors included in the smart phone to recognize the driving direction or the acceleration direction to select the front or rear imaging device to operate one of the front and rear imaging devices.

Figure 2:
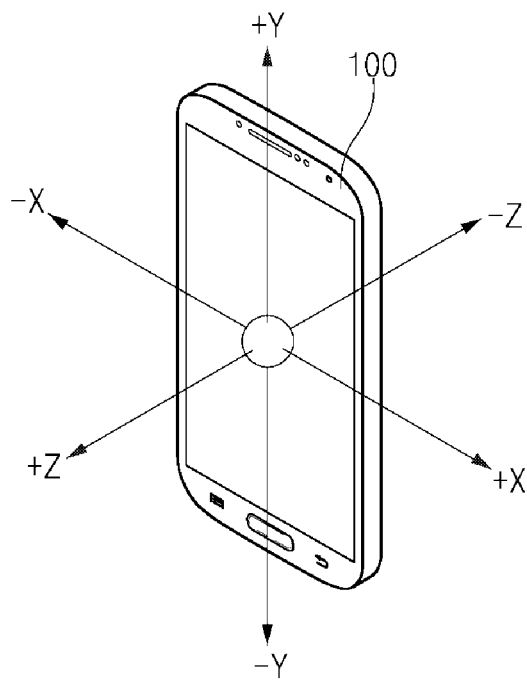
FIG. 2 is an exemplary diagram describing a method for using an acceleration sensor in a smart phone at the time of vehicle driving according to an exemplary embodiment of the present disclosure.

FIG. 2 is an exemplary diagram describing a method for using an acceleration sensor in a smart phone at the time of vehicle driving according to an exemplary embodiment of the present disclosure. Referring to FIG. 2, a method for operating an accelerator sensor included within a vehicle is described. As illustrated in FIG. 2, the accelerator sensor may be used simultaneously with the driving of the vehicle and when an accelerator sensor value of a −z axis in the smart phone is positive (+) or an accelerator sensor value is a −z value, the progress direction of the vehicle is a −z axis direction, and the rear imaging device may be selected. When the accelerator sensor value of a +z axis is positive (+) or the accelerator sensor value is a +z value, the progress direction of the vehicle is a +z axis direction, the front imaging device may be automatically selected.

As described above, according to the exemplary embodiments of the present disclosure, costs associated with installation of imaging devices in vehicles may be reduced by using a smart phone of a vehicle driver or passengers to recognize the lanes and the obstacles in front of and in back of the vehicle. Further, according to exemplary embodiments of the present disclosure, since the plurality of imaging devices in the smart phone within a moving vehicle may be automatically selected, driver convenience may be increased since a driver may not be required to manually select an imaging device, while driving.

Further, according to the exemplary embodiments of the present disclosure, replacement of the imaging device sensors of a vehicle may be possible, using a freely detachable/attachable smart phone. In addition, according to the exemplary embodiments of the present disclosure, it may be possible to freely select and use the imaging device sensor disposed within the vehicle and the imaging device sensor disposed within the smart phone, when the imaging device sensor is within the vehicle.

Although the exemplary embodiments of the present disclosure have been disclosed based on restricted configuration and drawings, the technical ideas of the present disclosure are not limited thereto. Therefore, those skilled in the art will appreciate that various modifications and changes may be made, without departing from the scope and spirit of the present disclosure as disclosed in the accompanying claims.

What is claimed is:

1. A system for assisting vehicle driving using a smart phone including a plurality of imaging devices, comprising:
    a smart phone configured to capture an image in front of a vehicle and an inner image of the vehicle using the plurality of imaging devices and automatically select one of the plurality of imaging devices; and
    a controller configured to analyze image information provided from the plurality of imaging devices to operate the smart phone or operate the vehicle,
    wherein the controller is configured to operate one of the front and rear imaging devices coinciding with a driving direction of the vehicle by using a sensor provided from the smart phone when the vehicle is continuously driven, and
    wherein in the operating of one of the front and rear imaging devices using a sensor provided from the smart phone, the front and rear imaging devices are operated using signal output information of sensors in the smart phone.

2. The system for assisting vehicle driving of claim 1, wherein the smart phone includes an imaging device sensor, a gyroscope sensor, an accelerator sensor, a magnetic field sensor, an illumination sensor, a proximity sensor, and a gravity sensor.

3. The system for assisting vehicle driving of claim 1, further comprising:

an alarm configured to output an alarm message t when an image capture direction of the imaging device is not an image capture direction of the imaging device designated by a driver.

4. The system for assisting vehicle driving of claim 1, further comprising:
a sensor configured to detect vehicle information including a driving speed of the vehicle, a longitudinal acceleration, a transversal acceleration, and an angle and an angular velocity of a wheel.

5. A method for assisting vehicle driving using a smart phone including a plurality of imaging devices, comprising:
operating, by a controller, a front imaging device and a rear imaging device in the smart phone to capture an image, before a vehicle starts to drive;
selecting, by the controller, one of the front and rear imaging devices by comparing the photographed images;
operating, by the controller, one of the front and rear imaging devices coinciding with a driving direction of the vehicle by using a sensor provided from the smart phone when the vehicle is continuously driven; and
operating, by the controller, the smart phone or the vehicle by analyzing image information provided from the plurality of imaging devices,
wherein in the operating of one of the front and rear imaging devices using a sensor provided from the smart phone, the front and rear imaging devices are operated using signal output information of sensors in the smart phone.

6. The method for assisting vehicle driving of claim 5, wherein the sensor includes an imaging device sensor, a gyroscope sensor, an accelerator sensor, a magnetic field sensor, an illumination sensor, a proximity sensor, and a gravity sensor.

7. The method for assisting vehicle driving of claim 6, wherein the accelerator sensor is used simultaneously with the driving of the vehicle and when an accelerator sensor value of a −z axis in the smart phone is positive (+) or an accelerator sensor value is a −z value, the progress direction of the vehicle is a −z axis direction, wherein the rear imaging device is selected and when the accelerator sensor value of a +z axis is positive (+) or the accelerator sensor value is a +z value, the progress direction of the vehicle is a +z axis direction, such that the front imaging device is automatically selected.

8. The method for assisting vehicle driving of claim 5, further comprising:
outputting an alarm message to the driver when an image capture direction of the imaging device is not an image capture direction of the imaging device designated by a driver.

9. A non-transitory computer readable medium containing program instructions executed by a controller for assisting vehicle driving, the computer readable medium comprising:
program instructions that operate a front imaging device and a rear imaging device in the smart phone to capture an image, before a vehicle starts to drive;
program instructions that select one of the front and rear imaging devices by comparing the photographed images;
program instructions that operate one of the front and rear imaging devices coinciding with a driving direction of the vehicle using a sensor provided from the smart phone when the vehicle is continuously driven and operate one of the front and rear imaging devices using a sensor provided from the smart phone, the front and rear imaging devices are operated using signal output information of sensors in the smart phone; and
program instructions that operate the smart phone or the vehicle by analyzing image information provided from the plurality of imaging devices.

10. The non-transitory computer readable medium of claim 9 wherein the sensor includes an imaging device sensor, a gyroscope sensor, an accelerator sensor, a magnetic field sensor, an illumination sensor, a proximity sensor, and a gravity sensor.

11. The non-transitory computer readable medium of claim 10, wherein the accelerator sensor is used simultaneously with the driving of the vehicle and when an accelerator sensor value of a −z axis in the smart phone is positive (+) or an accelerator sensor value is a −z value, the progress direction of the vehicle is a −z axis direction, such that the rear imaging device is selected and when the accelerator sensor value of a +z axis is positive (+) or the accelerator sensor value is a +z value, the progress direction of the vehicle is a +z axis direction, such that the front imaging device is automatically selected.

12. The non-transitory computer readable medium of claim 9, further comprising
program instructions that output an alarm message to the driver when an image capture direction of the imaging device is not an image capture direction of the imaging device designated by a driver.

* * * * *